(12) United States Patent
Seymour

(10) Patent No.: US 6,488,063 B2
(45) Date of Patent: Dec. 3, 2002

(54) DELIMBING DEVICE AND METHODS

(75) Inventor: Kerry Richard Seymour, Perry, GA (US)

(73) Assignee: Riley Manufacturing, Inc., Montezuma, GA (US)

( * ) Notice: Subject to any disclaimer, the term of this patent is extended or adjusted under 35 U.S.C. 154(b) by 0 days.

(21) Appl. No.: 10/012,633

(22) Filed: Nov. 13, 2001

(65) Prior Publication Data

US 2002/0062880 A1 May 30, 2002

Related U.S. Application Data

(63) Continuation-in-part of application No. 09/726,154, filed on Nov. 29, 2000.

(51) Int. Cl.$^7$ .......................... A01G 23/08; B27L 1/00
(52) U.S. Cl. .................... 144/338; 144/4.1; 144/24.13; 144/343
(58) Field of Search ............... 144/4.1, 24.13, 144/34.1, 336, 338, 343

(56) References Cited

U.S. PATENT DOCUMENTS

| | | | |
|---|---|---|---|
| 3,029,848 A | | 4/1962 | Bombardier |
| 3,269,436 A | | 8/1966 | Moore |
| 3,398,774 A | * | 8/1968 | Hahn ...................... 144/24.13 |
| 3,635,266 A | | 1/1972 | Eriksson |
| 3,805,858 A | | 4/1974 | Morin |
| 3,948,299 A | | 4/1976 | Laforge et al. |
| 4,067,367 A | * | 1/1978 | Adamson ................. 144/24.13 |
| 4,130,151 A | | 12/1978 | Ericsson |
| 4,335,766 A | | 6/1982 | Davis et al. |
| 4,350,189 A | | 9/1982 | Duchesne |
| 4,382,457 A | | 5/1983 | Hahn |
| 4,440,202 A | * | 4/1984 | Everett ..................... 144/24.13 |
| 4,574,855 A | | 3/1986 | Jörgensen et al. |
| 4,588,008 A | | 5/1986 | Napper |
| 4,766,939 A | | 8/1988 | Forslund |
| 4,981,163 A | | 1/1991 | Westlund |
| 5,146,960 A | | 9/1992 | Blakely |
| 5,174,350 A | | 12/1992 | Johansson et al. |
| 5,406,997 A | | 4/1995 | Davison |
| 5,533,555 A | * | 7/1996 | Hudson ..................... 144/24.13 |
| 5,628,354 A | | 5/1997 | Kingston |
| 5,704,407 A | | 1/1998 | Hamby, Jr. |
| 5,887,635 A | * | 3/1999 | Hamby, Jr. ................. 144/343 |
| 6,155,317 A | | 12/2000 | Seymour |

OTHER PUBLICATIONS

Hahn HTL 300/F Tree Length Processor, manufacturerd by Hahn Machinery, Inc., specifications sheet. (admitted prior art).

Article regarding Johnson Logging, publication date unknown. (admitted prior art).

Advertisement Introducing CTR Grapples and the New 550 Delimber; publication date unknown. (admitted prior art).

* cited by examiner

*Primary Examiner*—W. Donald Bray
(74) *Attorney, Agent, or Firm*—Kilpatrick Stockton LLP

(57) ABSTRACT

A push-through delimber device having a frame, a blade lattice, a trough, a throat and a saw so that trees can be topped and delimbed in the throat and pushed through the delimbing blade lattice to further delimb the trees. The delimber device can also include pivoting arcuate blades for delimbing trees.

34 Claims, 10 Drawing Sheets

DELIMBING DEVICE AND METHODS

RELATED APPLICATIONS

This application is a continuation-in-part of co-pending non-provisional patent application Ser. No. 09/726,154, filed on Nov. 29, 2000, entitled "Delimbing Device and Methods."

FIELD OF THE INVENTION

This invention relates to logging equipment and, more specifically, to devices used to strip branches off harvested or felled trees.

BACKGROUND OF THE INVENTION

Historically, delimbing felled or harvested trees was performed manually using axes, hand saws and powered chain saws. This method of delimbing works well on large trees with sporadic branches because the weight of a felled tree trunk will snap many of the branches off the trunk leaving a minimal amount of delimbing to be performed. When smaller trees with many branches are felled, the trunk weight is often insufficient to cause the branches to snap off. Consequently, the hand delimbing process was dangerous and unpredictable, as well as time consuming.

As a result, delimbers have been developed which strip branches off a whole tree at the harvesting site, thereby eliminating the need for manual delimbing and drastically reducing the time necessary for delimbing. Thus, the need for delimbing machines has grown over the years as modern forestry practice has relied on clear cutting and forest thinning through the removal of smaller trees.

A popular type of delimber is a pull through delimber. The majority of pull through delimbers allow for a tree to be placed in the delimbing device with delimbing blades surrounding and parallel to the tree trunk. The tree is then pulled through the device with the blades cutting the branches as it traverses the assembly. The majority of these types of machines contain hydraulics or electronics causing them to be very expensive to purchase and operate. As a result of the high purchase and operating costs, many logging operations cannot afford to purchase such delimbers. Another disadvantage of these types of delimbers is that they only delimb one tree at a time. Additionally, most of these delimbing assemblies are very complicated with many moveable parts that are susceptible to damage and breakdown.

A second type of delimbing device is the mechanical pull through type delimber. U.S. Pat. No. 5,406,997, to Davison, describes a mechanical pull through delimbing device that does not use any electronic or hydraulic components. Instead, the Davison device uses the weight of a tree to actuate the delimbing blades. In Davison, a tree is placed onto the assembly so that the weight of the tree rests on a lever causing a set of delimbing blades to close about the trunk. The trunk is then pulled through the delimbing assembly causing the branches to be stripped off the trunk.

The Davison device eliminates the use of hydraulics and electronics; however, the assembly uses many moving parts that are susceptible to breakdown and jamming. Furthermore, the Davison delimber only allows for one tree to be placed into the assembly at a time resulting in a slow and tedious process in delimbing trees in a logging operation. An additional drawback associated with the Davison device is that it relies on the weight of the tree to close the blades. This method of operation is troublesome for small trees whose weight is insufficient to properly close the blades around the trunk. Davison also uses a spring to exert an opposite force on the support lever, and the spring is susceptible to stretching and breaking.

In general, most mechanical delimbing devices are cost prohibitive for soft wood logging operations because of the capital investment and maintenance requirements of complicated delimbing apparatuses. In addition, many delimbers in the market are cumbersome to transport from one site to another and require setup and breakdown time. Thus, what is needed is a delimbing device that delimbs multiple trees, is easily transportable, has few movable parts, and is affordable.

SUMMARY OF THE INVENTION

This invention is a stationary assembly used to strip limbs from trees. The delimbing assembly is mounted on a base trailer. The base has an axle and wheels on one end and a hitch on the other allowing for easy transportation from one harvesting site to another. The assembly allows multiple trees to be processed simultaneously. The blade assembly includes a plurality of criss-crossing straight blades forming a plurality of apertures. A knuckle boom loader, for example, pushes multiple trees through the delimber. To increase the efficiency of the delimber, a trough structure directs the trees into the blade assembly. As trees are pushed through the blade lattice, each trunk moves through an open aperture allowing the limbs to come into contact with a blade edge; thereby stripping the limbs from the trunk. A saw box is coupled to the assembly for topping the trees.

In another embodiment, the delimbing assembly includes a plurality of arms, having delimbing blades, for containing and delimbing at least one tree. The arms are mounted to a carriage and are controlled individually with hydraulic actuators. Each arm can include a delimbing blade. Further, the delimbing assembly can include an arcuate delimbing blade mounted to the carriage. In operation, this embodiment of the delimbing assembly accepts trees within the arms. The arms close around the trees and the loader pulls the trees partially through the arms, cutting off some, if not all, of the limbs. A delimbing saw then tops the tree, and the tree is removed from the assembly after the arms are opened to allow for removal of the trees. If the trees require further delimbing, the trees are inserted into the blade assembly described above.

Primary objectives of this invention are to provide:

the logging industry with a push through delimbing device that is durable, easier to use, less susceptible to jamming and less expensive to operate;

a push through delimbing device that can delimb multiple trees simultaneously;

a push through delimbing device that operates without the aide of any hydraulic, mechanical or electronic control; and a push through delimbing assembly for use in delimbing soft wood or hard wood trees, which is affordable throughout the logging industry.

Still further objects and advantages will become apparent from consideration of the following description and drawings.

DETAILED DESCRIPTION OF THE DRAWINGS

Figure 1A:
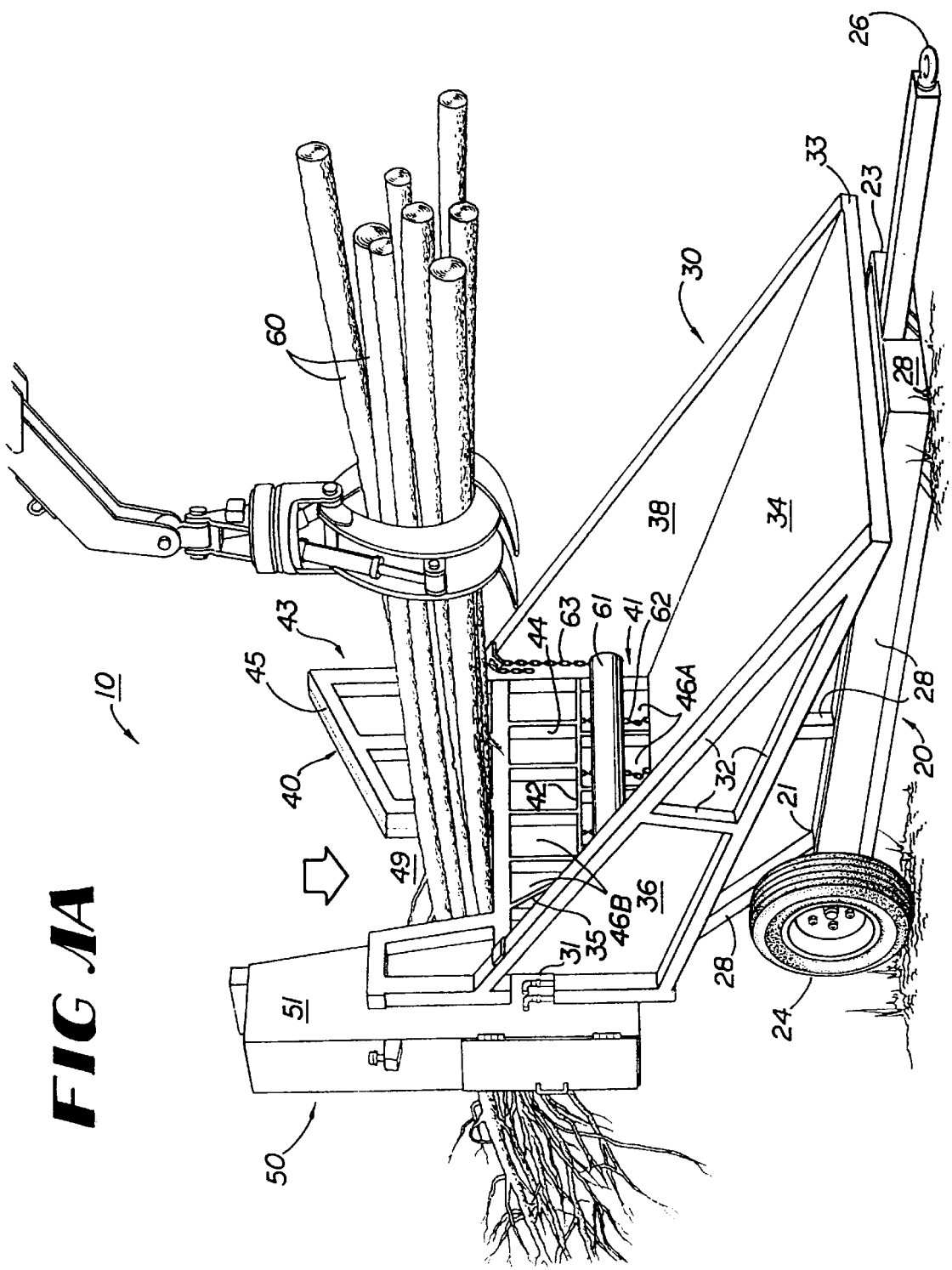
FIG. 1A is a front perspective view of the delimbing assembly of this invention holding multiple trees in the throat.
Figure 1B:
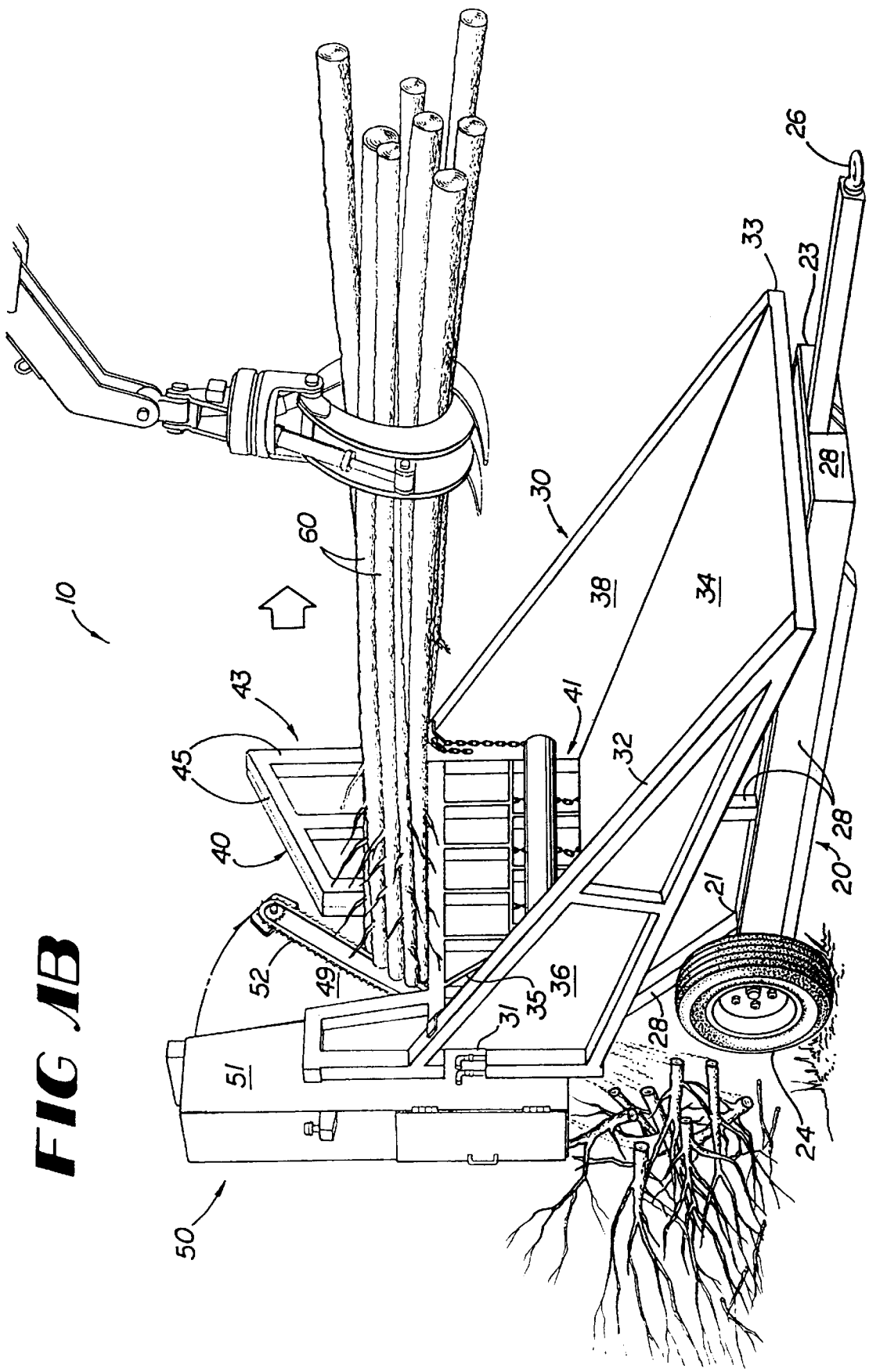
FIG. 1B is a front perspective view of the delimbing assembly of FIG. 1A showing the trees being topped.
Figure 1C:
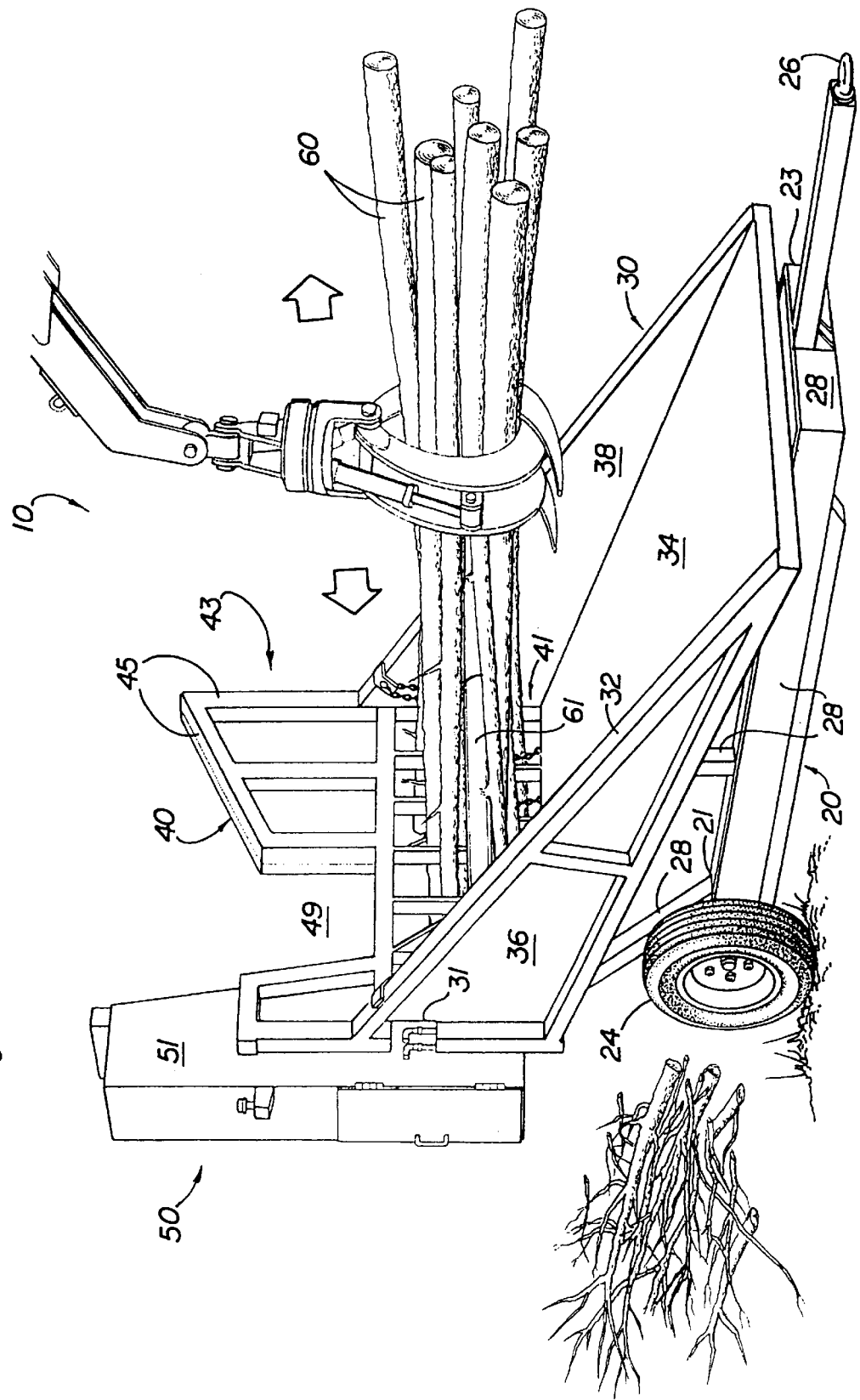
FIG. 1C is a front perspective view of the delimbing assembly of FIG. 1A showing the trees being pushed through the blade lattice.

FIGS. 1A–C show a front perspective view of an exemplary stationary push-through delimber 10 of this invention. Delimber 10 includes a trailer frame 20 that supports a trough 30 closed on one end by a blade assembly 40 and a saw box 50.

Trailer frame 20 is formed from rigid material such as tubular steel beams 28. Beams 28 are welded or otherwise fastened together to form frame 20. Trailer frame 20 rests on axel 22 (see FIG. 2) and wheels 24 mounted at end 21 of trailer 20. A hitch 26 is mounted to end 23 of trailer 20. Wheels 24 and hitch 26 allow for ease of use and transport of delimber 10 from one logging location to another.

Trough 30 is formed from a steel frame 32, a bottom steel plate 34, and left and right steel plates 36 and 38, respectively. Plates 34, 36 and 38 are welded or otherwise attached to frame 32 and each other. Trough 30 is also coupled to trailer frame 20. Side walls 36 and 38 are coupled so that they are perpendicular to bottom steel plate 34. Trough 30 also has an first open end 33 that aligns with end 23 of trailer 20 and a second open end 31 that terminates into blade assembly 40. Because trough 30 slopes upward from end 33 to end 31, trough 30 directs the tree or trees into blade assembly 40 during the delimbing process. To further direct trees into blade assembly 40, a baffle 35 is vertically coupled between side wall 36 and blade assembly 40. Baffle 35 is situated at a 45 degree angle so that trees 60 are deflected off baffle 35 and into blade assembly 40.

Blade assembly 40 has two major areas. The first is a rectangular blade lattice 41 and the second is a upper support section 43. Blade lattice 41 is formed from a single horizontal blade 42 and multiple vertical blades 44, which are coupled to each other and to a frame 45. Blades 42 and 44 may typically be ¾"×6" flat bar mild steel. Neither edges of blades 42 and 44 need be sharpened. However, the edges of blades 42 and 44 may be sharpened. The crisscrossing blades form a plurality of apertures 46A and 46B for allowing individual trunks to pass through blade assembly 40. Upper support section 43 is formed from a portion of frame 45 and consists of a "U" shaped aperture or "throat" 49 for receiving a plurality of trees and a slanted portion of frame 45 for directing trees into throat 49.

Figure 2:
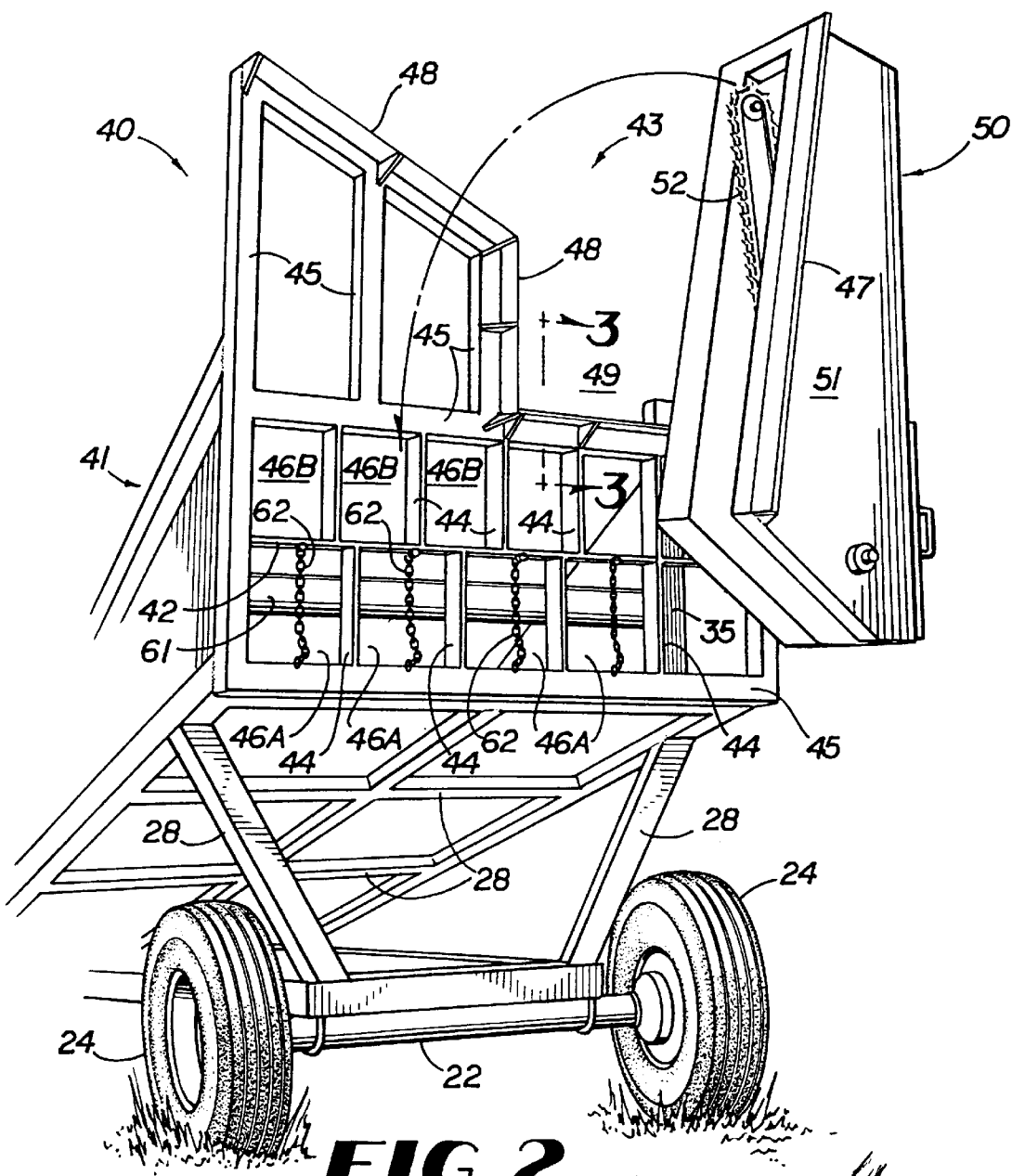
FIG. 2 is a rear perspective view of the delimbing assembly of FIG. 1A showing the saw box and the rear of the blade lattice.
Figure 3:
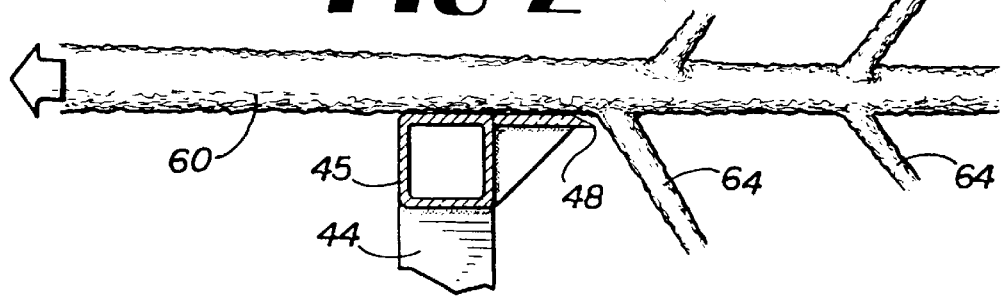
FIG. 3 is a cut away view along line 3—3 of FIG. 2 showing a blade in contact with a tree limb.

As shown in FIG. 2, apertures 46A and 46B are of unequal size. Top apertures 46B are sized, for example, 13"×17" and lower apertures 46A are sized, for example, 16"×17". In addition, lower apertures 46A are bisected by vertically suspended flexible dividers 62. For illustrative purposes, flexible dividers 62 are shown in the drawings as chains. Flexible dividers 62 are mounted between horizontal blade 42 and frame 45 so that flexible dividers 62 contain slack. The slack in flexible dividers 62 allow them to move somewhat horizontally within apertures 46A. It can be appreciated that flexible dividers 62 may be replaced by, for example, a flexible cable or any other suitable means. Flexible dividers 62 are welded in place or otherwise attached.

Figure 1D:
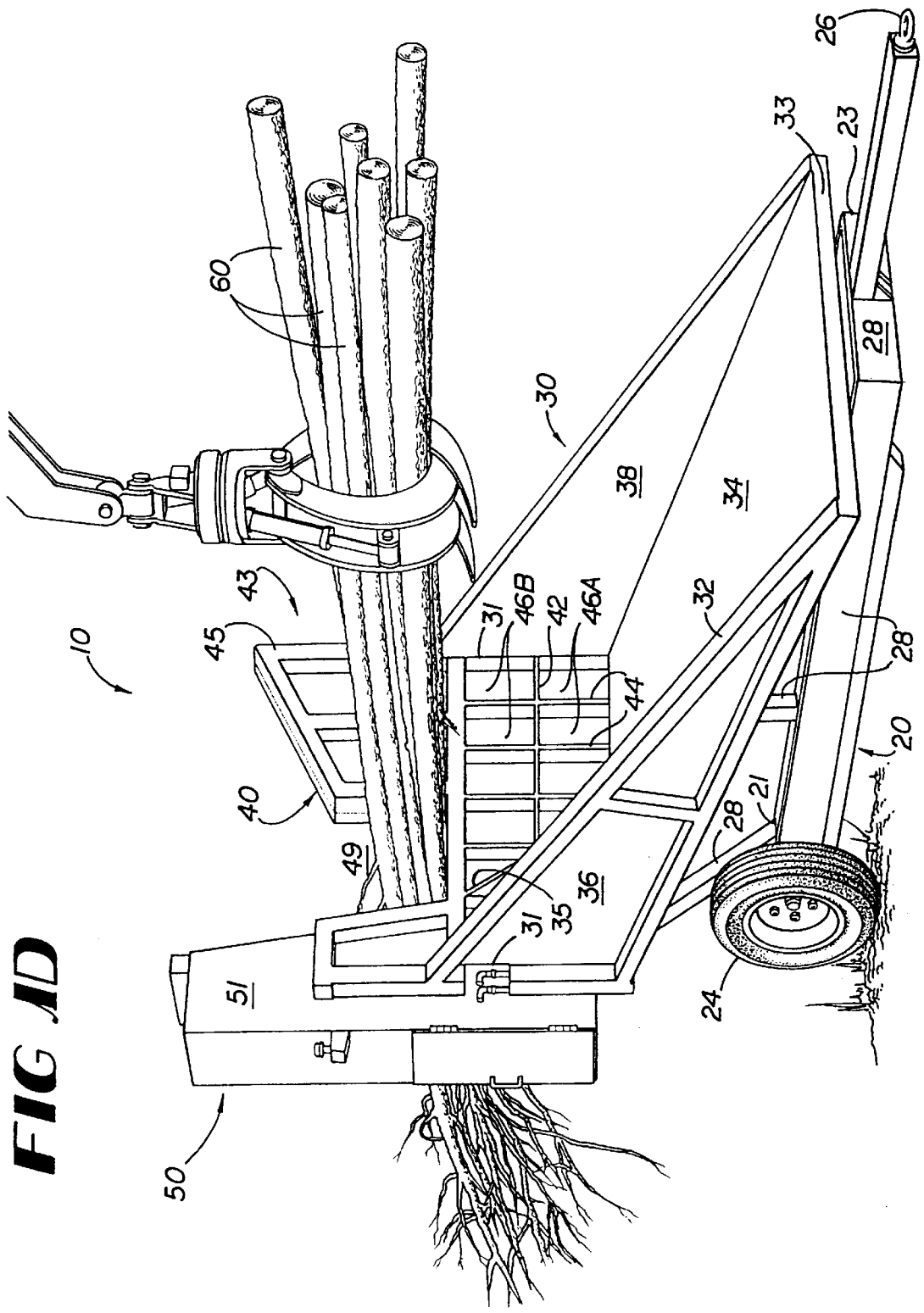
FIG. 1D is a front perspective view of the delimbing assembly of FIG. 1A showing an alternate embodiment of the blade lattice of FIG. 1A.

Referring now to FIGS. 1A–1C and 2, a moveable barrier 61 is suspended from chains 63 to hang horizontally across and in front of blade lattice 41. Barrier 61 can be mounted to frame 45 or to trough 30 using chains 63, cables or any other suitable means to suspend barrier 61 in position. Barrier 61 effectively reduces the size of apertures 46A. However, because barrier 61 is suspended using chains 63, barrier 61 is free to move in the vertical direction in effect making the size of apertures 46A variable. Preferably, barrier 61 is a pipe with a six inch diameter and suspended so that the top of barrier 61 is aligned with the top of horizontal blade 42. Although barrier 61 is preferred to increase the efficiency and effectiveness of delimber 10, delimber 10 can operate without barrier 61, as shown in FIG. 1D. In addition, the alternate blade lattice shown in 1D can also be used; thereby eliminating the need for flexible dividers 62.

To aide in the delimbing process, two additional delimbing blades 47 and 48 are coupled to delimber 10. The first blade 47 is mounted on the rear of saw box 50 and the second blade 48 is mounted on the top edge of frame 45, which are clearly shown in FIG. 2. The edges of blades 47 and 48 are orientated so that they point away from trough 30.

Figure 4:
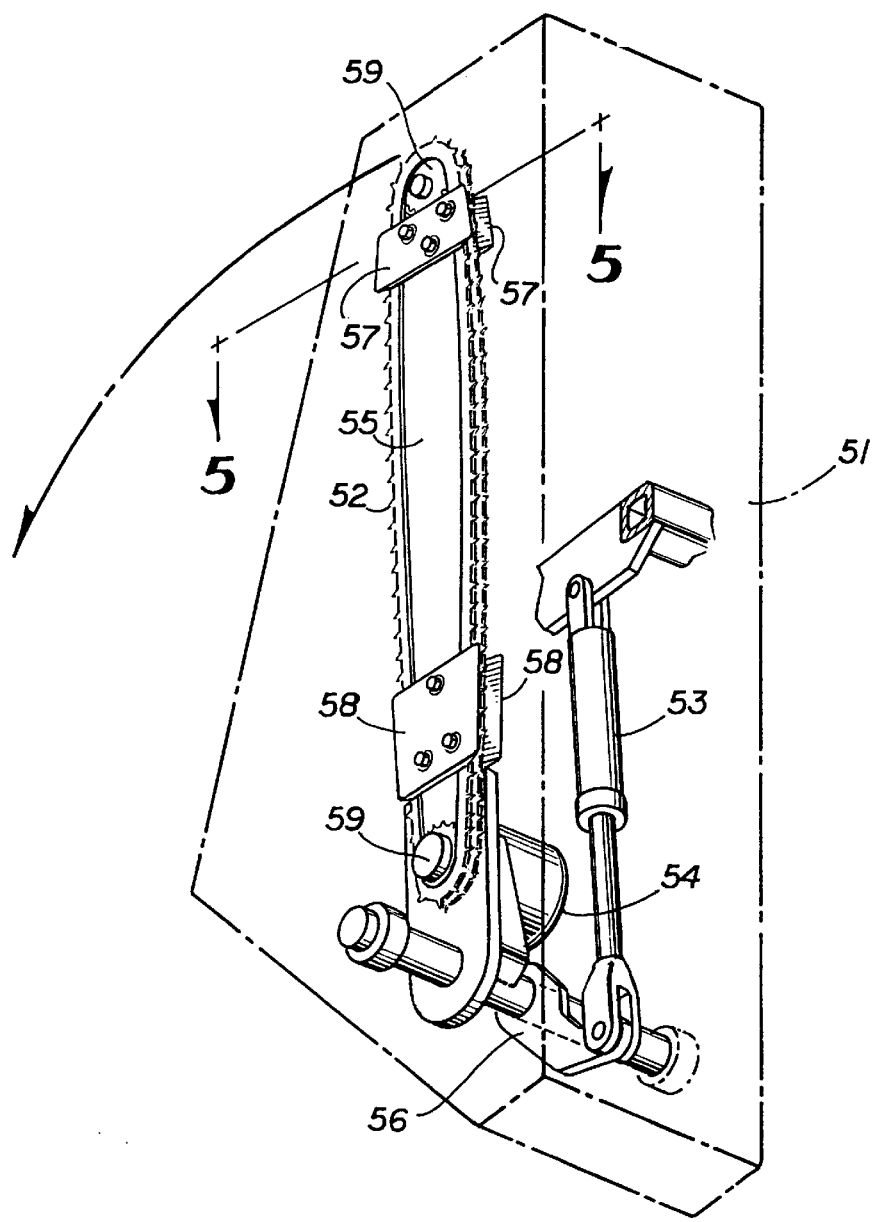
FIG. 4 is a perspective view of the saw box shown in FIGS. 1–2.
Figure 5:
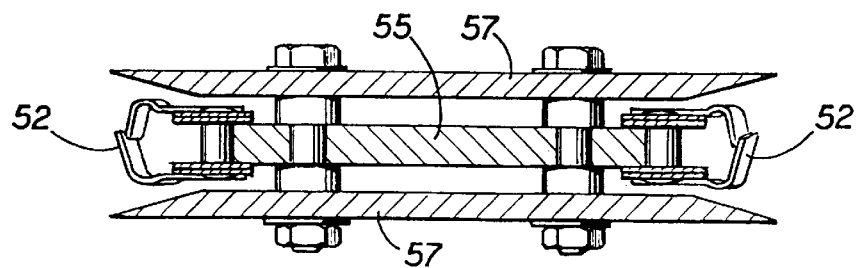
FIG. 5 is a detail cut away view along line 5—5 of FIG. 4 showing a chainsaw guide of the this invention.

Saw box 50 mounted on the rear of delimber 10, as shown in FIGS. 1A–C so that a blade 52 can top trees 60. Saw box 50 includes a housing 51, cutting blade 52, a hydraulic actuator 53, motor 54 blade plate 55 and actuator arm 56, as shown in FIG. 4. As shown in FIGS. 1A–D, saw box 50 is orientated such that blade 52 will top trees lying in throat 49 by pivoting across throat 49. Blade rerailer plates 57 and 58 (see FIG. 5) are coupled to blade plate 55 to assist in keeping chain saw blade 52 from falling off sprockets 59.

Delimber 10 operates on multiple trees 12 or on a single tree as follows. As shown in FIG. 1A, a plurality of trees 60 are lifted by their butt ends and placed into throat 49. Any straggling trees are directed into throat 49 by the sloped portion of frame 45. Trees 60 are then pulled back toward trough 30 to position the trees for topping. During the positioning stage, delimbing blades 47 and 48 strip most of the limbs 64 off trees 60. Once trees 60 are properly positioned in throat 49 for topping, saw blade 52 pivots from housing 51 and cuts off the tops of trees 60, as shown in FIG. 1B.

Finally, as shown in FIG. 1C, after topping occurs the trees are pushed through the delimbing blade lattice to strip the remaining limbs 64 from trees 60. The loader can move trees 60 back and forth through blade lattice 41 until all limbs 64 have been removed. Barrier 61 is used to block a portion of lower apertures 46A, effectively making lower apertures 46A smaller. As the trunks are pushed through blade lattice 41, barrier 61 moves upward or downward to accommodate different size trunks. Consequently, barrier 61 aides in delimbing small limbs 64 that would ordinarily pass through apertures 46A without being sheared off. As trees 60 are passed through apertures 46A, barrier 61 adjusts to the proper height in effect sizing apertures 46A so that all limbs 64 are effectively sheared of trees 60. In addition, flexible dividers 62 conform to the trunks moving through apertures 46A, thereby effectively increasing the ability to shear limbs 64 from small trees. Delimbed trees 60 are then piled to the side of delimber 10 and a new set of trees is processed.

Figure 6:
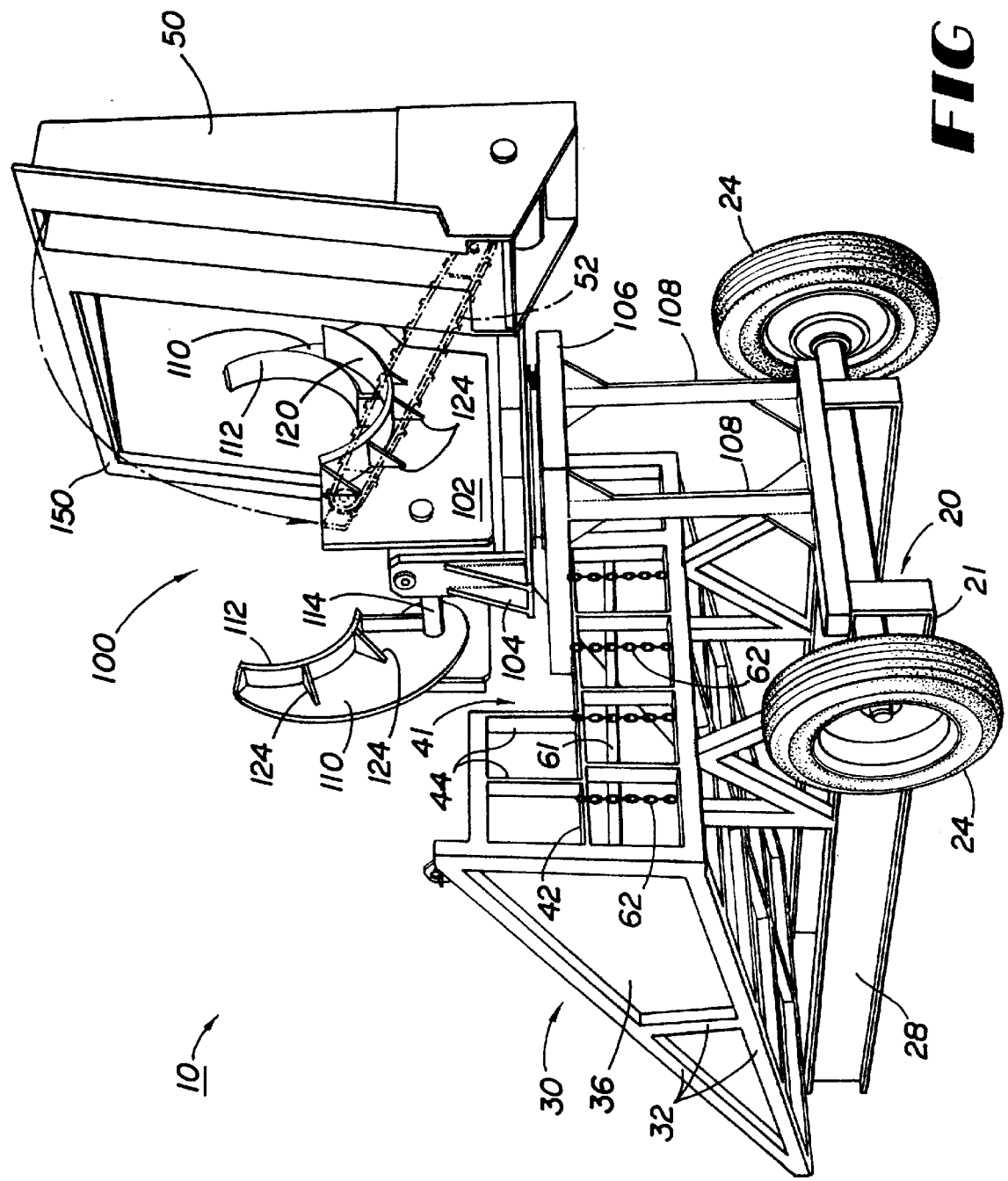
FIG. 6 is a perspective view of another embodiment of the delimbing assembly of this invention.
Figure 9:
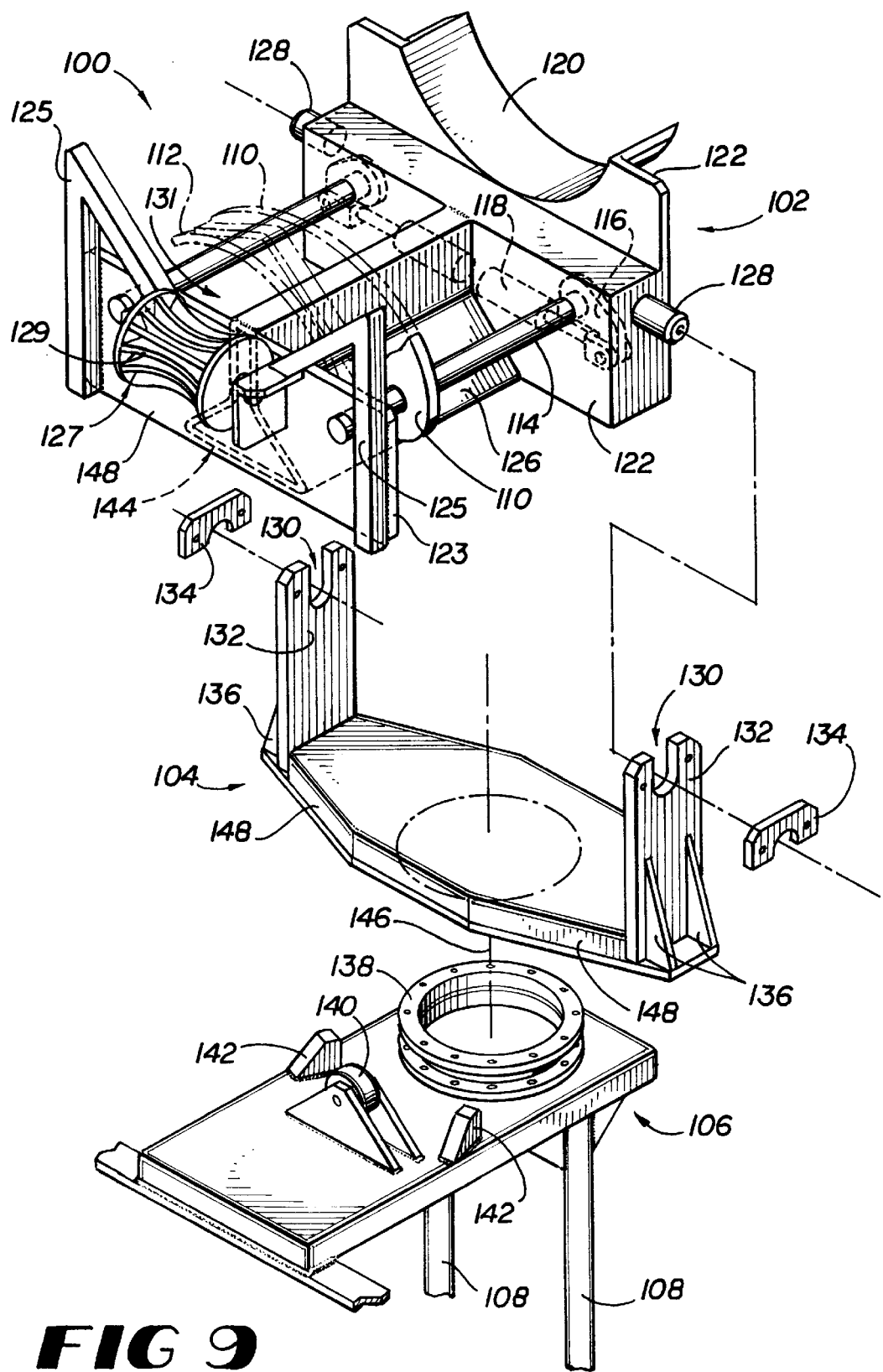
FIG. 9 is an exploded view of the delimbing assembly shown in FIGS. 6–8.

In another embodiment, the delimber 10 includes delimber assembly 100, as shown in FIG. 6, which is composed of blade carriage 102, cradle 104, and support frame 106. Delimber assembly 100 is coupled to trailer frame 20 and blade lattice 41 through support frame 106 and support columns 108. Blade carriage 102 includes two arms 110, each having an arcuate delimbing blade 112. Arcuate delimbing blades 112 can be welded to arms 110 and supported with braces 124. Alternatively, either arm 110 can be used without blade 112. Each arm 110 is coupled to the blade carriage 102 through a crankshaft 114, which allows arms 110 to grasp and release a single tree or a bundle of trees. Crank arm 116 couples each crankshaft 114 with a hydraulic cylinder 118 that controls the position of arm 110, as shown in FIG. 9. Blade carriage 102 further includes a stationary arcuate delimbing blade 120 that is rigidly attached to rear plate 122. Stationary blade 120 can be welded to rear plate 122 and supported with braces 124. Alternatively, stationary blade 120 can be integrally formed within rear plate 122 or can be attached to rear plate 122 using screws, bolts, rivets, and the like.

As shown in FIG. 9, a plurality of guides 125 are attached to blade carriage 102 at front face 148 forming throat 131. Throat 131 is located above the delimbing blade lattice 41 and can be "U" shaped, "V" shaped, or any other shape that can assist in guiding trees to rest between arms 110 and stationary blade 120. Guides 125 are positioned to guide a load of trees to rest between arms 110 and stationary blade 120. Nose roller 127 is rotatably attached to guides 125 through a plurality of braces and a shaft. Alternatively, nose roller 127 is attached to front face 148 or other portion of blade carriage 102. Nose roller 127 includes a hollow cylindrical cavity for receiving a shaft. Paddles 129 are attached to the exterior surface of nose roller 127 and are composed of flat bar steel. Alternatively, nose roller 127 can be composed of other metals, plastics or other materials capable of withstanding forces generated during use of the delimber assembly 100. Nose roller 127 further includes a grease fitting for greasing the hollow cylindrical cavity that contacts the shaft.

Blade carriage 102 includes limb diverter baffles 126 mounted between a front plate 123 and the rear plate 122. Limb diverter baffles 126 prevent limbs from collecting in cradle 104 during operation. Specifically, limb diverter baffles 126 deflect limbs and other debris from cradle 104 and onto the ground beneath delimber 10.

Blade carriage 102 is coupled to cradle 104 using carriage support trunnions 128, which are received by slots 130 located within trunnion supports 132. Trunnion collars 134 prevent each carriage support trunnion 128 from escaping slots 130. Trunnion collars 134 can be attached to trunnion supports 130 with nuts and bolts, screws, rivets, welds, or other fastening devices. Trunnion supports 132 are rigidly attached to cradle 104 and supported by braces 136.

Cradle 104 is attached to support frame 106 though journal 138. Cradle 104 may be attached with nuts and bolts, screws, rivets, welds, or other fastening devices. Support frame 106 includes roller 140 and a plurality of frame stops 142. Roller 140 at least partially supports blade carriage 102 by contacting bottom surface 144 of blade carriage 102. Roller 140 can be made of steel, aluminum or other durable material. Frame stops 142 are positioned on support frame 106 to allow cradle 104 to rotate around z-axis 146. If cradle 104 is rotated too far about z-axis 146, front face 148 contacts a frame stop 142. Thus, frame stops 142 allow blade carriage 102 and cradle 104 to rotate a fixed amount in order to accommodate a load of trees placed into blade carriage 102 at a misaligned angle.

Delimber assembly 100 includes a saw box 50 and a saw blade 52 as described above. Saw box 50 is oriented so that saw blade 52 can top a tree lying between arms 110 by pivoting as shown in FIG. 6. Guide 150 is attached to saw box 50 to enable the loader to place a tree between arms 110 and stationary blade 120.

Figure 7:
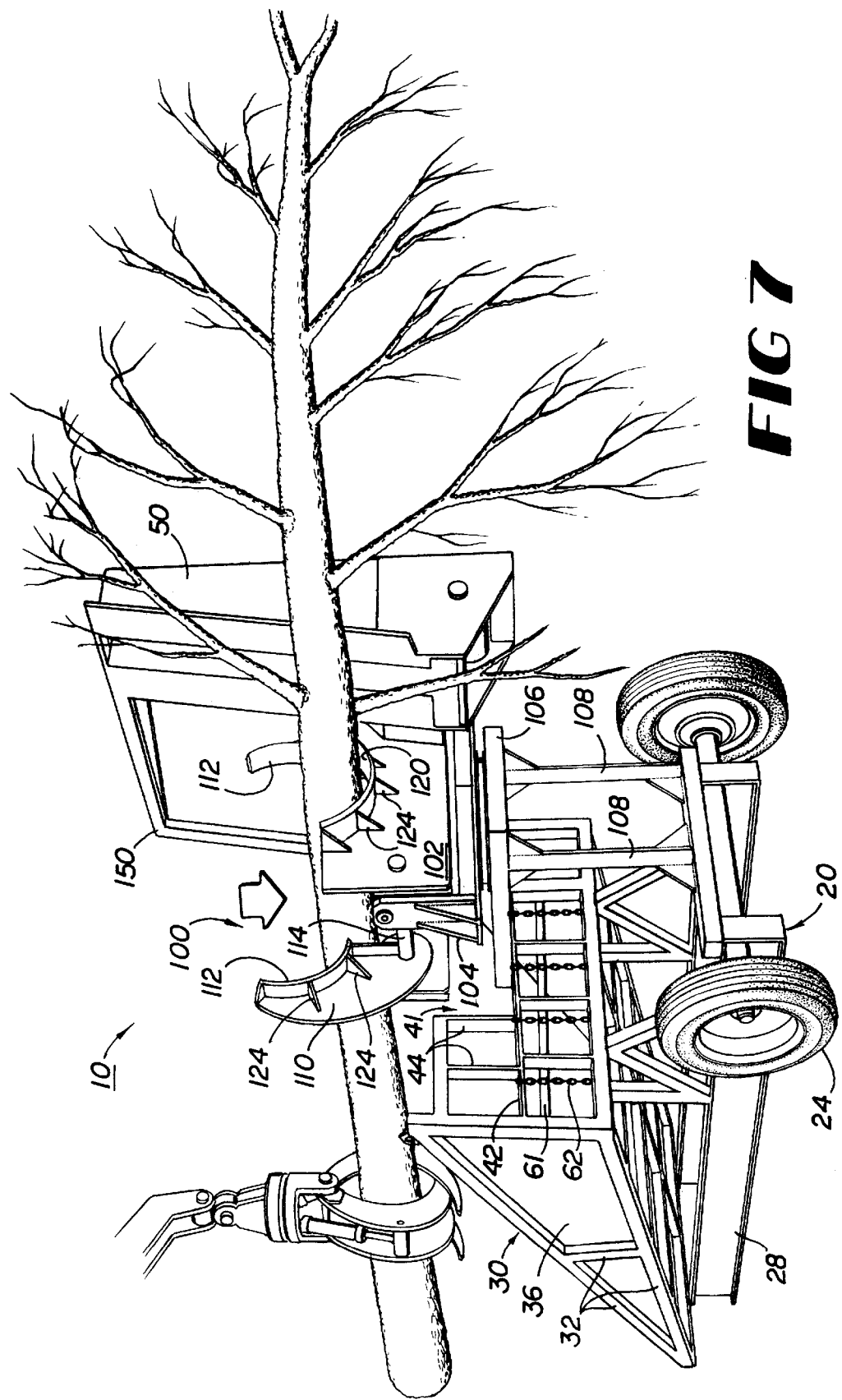
FIG. 7 is a perspective view of the delimbing assembly shown in FIG. 6 that shows placement of a tree within a throat.
Figure 8:
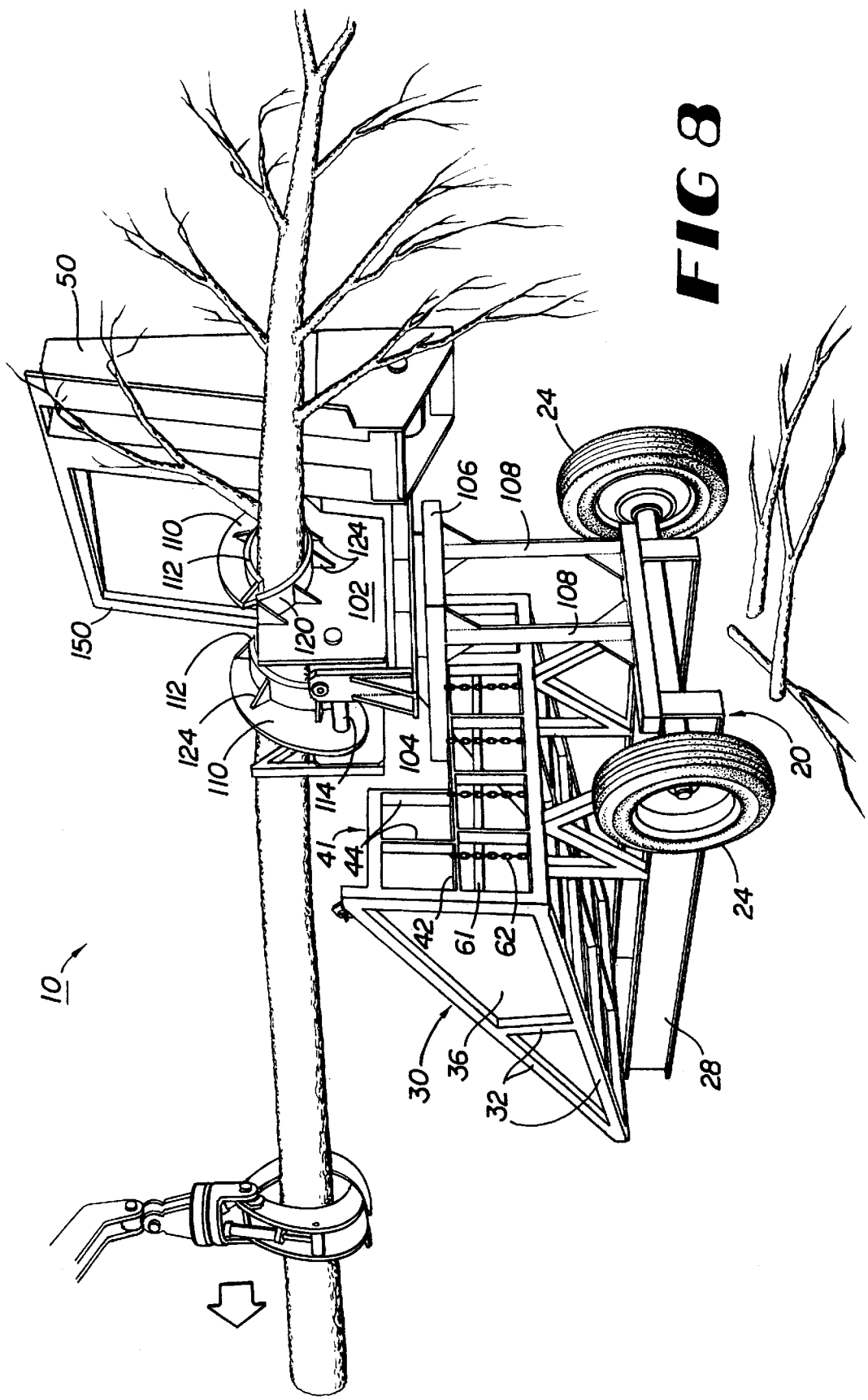
FIG. 8 is a perspective view of the delimbing assembly shown in FIGS. 6 and 7 that shows the direction in which trees are pulled to cut limbs.

In operation, a loader uses its grapple to grab a tree or a bundle of trees near their butt end, as shown in FIG. 7. The loader places the tree between arms 110 and stationary blade 120. Hydraulic cylinders 118 are then actuated to rotate arms 110 using crankshafts 114 so that the arms contact the tree. The loader then pulls the tree partially through arms 110, as shown in FIG. 8. The limbs of the tree are cut off as they contact blades 112 and stationary blade 120. The tree is not pulled completely through arms 110. Instead, the loader stops pulling the tree when the tree has almost been completely pulled through arms 110.

The loader then positions the tree to cut the top off of the tree. This may require that the loader push the tree partially back through arms 110. Once positioned, saw blade 52 tops the tree by moving through the swing path shown in FIG. 6. The saw can move through this path in one continuous motion, or it can move through this path in various segments in order to keep the saw from binding or stalling.

After topping is complete, hydraulic cylinders 118 are actuated to open arms 110 to allow the tree to be removed from delimber 10. The tree is then either further processed or removed entirely from the delimber 10 if enough limbs have been removed from the tree to allow the trees to be loaded onto a trailer for transportation. If enough limbs have been removed, the tree is removed from delimber 10 and placed onto a log pile or onto a truck to be hauled to a processing plant. If the tree needs further processing, the loader removes the tree from the delimber assembly 100. The loader then places the tree within trough 30 and pushes it into blade lattice 41, as shown in FIG. 1C. Pushing the tree into the blade lattice 41 one time is often sufficient to clean the limbs from the tree; however, the loader may push the tree into the blade lattice 41 more than one time if necessary. Once most of the limbs have been removed, or enough have been removed to facilitate easy transportation, the tree is placed onto a log pile or onto a truck to be hauled to a processing plant.

The foregoing is provided for purposes of illustrating, explaining, and describing embodiments of the present invention that provide a device for delimbing trees in a safe and economical manner. Modifications and adaptations to these embodiments will be apparent to those skilled in the art and may be made without departing from the scope or spirit of the invention or the following claims.

I claim:

1. A tree delimbing device, comprising:
   a. a frame;
   b. at least one horizontal delimbing blade coupled to the frame;
   c. at least one vertical delimbing blade coupled to the horizontal delimbing blade to form a delimbing blade lattice with a plurality of apertures; and
   d. at least one arcuate delimbing blade coupled to the frame.

2. The tree delimbing device of claim 1, further comprising a trough coupled to the blade lattice for directing trees into the delimbing blade lattice.

3. The tree delimbing device of claim 2, wherein the trough is sloped upward toward the delimbing blade lattice.

4. The tree delimbing device of claim 1, wherein the at least one arcuate delimbing blade is rotatably attached to the tree delimbing device.

5. The tree delimbing device of claim 1, wherein the at least one arcuate delimbing blade is fixedly attached to the tree delimbing device.

6. The tree delimbing device of claim 1, wherein the at least one arcuate delimbing blade is fixedly attached the tree delimbing device and further comprises at least two arms rotatably attached to the tree delimbing device and at least one arcuate delimbing blade attached to at least one arm.

7. The tree delimbing device of claim 1, further comprising a blade carriage for supporting the at least one arcuate delimbing blade.

8. The tree delimbing device of claim 7, further comprising a throat coupled to the blade carriage.

9. The tree delimbing device of claim 8, wherein the throat is located above the delimbing blade lattice.

10. The tree delimbing device of claim 8, wherein the throat is "U" shaped.

11. The tree delimbing device of claim 8, further comprising a roller coupled to the blade carriage proximate to the throat.

12. The tree delimbing device of claim 7, further comprising at least one limb deflector baffle coupled to the blade carriage.

13. The tree delimbing device of claim 7, further comprising a cradle capable of supporting the blade carriage.

14. The tree delimbing device of claim 13, wherein the cradle is rotatably attached to a support frame.

15. The tree delimbing device of claim 14, wherein the support frame further comprises at least one stop to contain movement of the cradle.

16. The tree delimbing device of claim 13, further comprising a roller for supporting the cradle and the blade carriage while allowing the cradle to move.

17. The tree delimbing device of claim 1, further comprising at least one hydraulic cylinder coupled with the at least one arcuate delimbing blade.

18. The tree delimbing device of claim 1, further comprising a saw box coupled to the tree delimbing device, the saw box housing a saw blade.

19. The tree delimbing device of claim 18, wherein a guide is coupled to the saw box.

20. The tree delimbing device of claim 1, further comprising a barrier that is suspended in a generally horizontal position proximate to the delimbing blade lattice.

21. The tree delimbing device of claim 20, wherein the suspended barrier can move vertically.

22. The tree delimbing device of claim 20, wherein the suspended barrier comprises a pipe.

23. The tree delimbing device of claim 1, further comprising at least one flexible divider bisecting at least one of the apertures.

24. The tree delimbing device of claim 23, wherein the flexible divider comprises cable.

25. The tree delimbing device of claim 23, wherein the flexible divider comprises chain.

26. The tree delimbing device of claim 1, further comprising a trailer assembly coupled to the tree delimbing device, comprising;
   a plurality of wheels coupled to the axel; and
   a hitch for trailering the tree delimbing device.

27. A method of delimbing a tree, comprising:
   a. grasping at least one tree comprising a longitudinal axis, a butt end and limbs on a top end;
   b. inserting at least a portion of the at least one tree within a delimbing device, comprising:
      a frame;
      at least one horizontal delimbing blade coupled to the frame;
      at least one vertical delimbing blade coupled to the horizontal delimbing blade to form a delimbing blade lattice with a plurality of apertures; and
      at least one arcuate delimbing blade coupled to the frame;
   c. removing at least a portion of the limbs from the at least one tree; and
   d. removing the at least one tree from the delimbing device.

28. The method of claim 27, wherein inserting at least a portion of the at least one tree within the delimbing device further comprises placing the at least one arcuate blade in contact with the at least one tree.

29. The method of claim 28, wherein removing at least a portion of the limbs from the tree further comprises moving at least a portion of the at least one tree across the at least one arcuate blade.

30. The method of claim 28, wherein the at least one arcuate blade is coupled to an arm and placing the at least one arcuate blade in contact with the at least one tree further comprises rotating the arm supporting the at least one arcuate blade.

31. The method of claim 30, wherein removing the at least one tree from the delimbing device further comprises removing the at least one arcuate blade from contact with the at least one tree.

32. The method of claim 27, wherein removing at least a portion of the limbs from the at least one tree further comprises inserting at least a portion of the at least one tree into the blade lattice and removing the portion of the at least one tree from the blade lattice.

33. The method of claim 27, wherein removing at least a portion of the limbs from the at least one tree further comprises cutting off a portion of the top end of the at least one tree using a saw blade coupled to the frame.

34. A tree delimbing device, comprising:
   a. a frame comprising a topside;
   b. at least one horizontal delimbing blade coupled to the frame;
   c. at least one vertical delimbing blade coupled to the horizontal delimbing blade to form a delimbing blade lattice with a plurality of apertures; and
   d. at least one arcuate delimbing blade coupled to the topside of the frame and positioned above the delimbing blade lattice.

* * * * *